Oct. 20, 1953 H. W. TREVASKIS 2,656,017
AUTOMATIC BRAKING APPARATUS FOR AIRCRAFT
Filed Nov. 14, 1950 4 Sheets-Sheet 1

Oct. 20, 1953  H. W. TREVASKIS  2,656,017
AUTOMATIC BRAKING APPARATUS FOR AIRCRAFT
Filed Nov. 14, 1950  4 Sheets-Sheet 2

Oct. 20, 1953    H. W. TREVASKIS    2,656,017
AUTOMATIC BRAKING APPARATUS FOR AIRCRAFT
Filed Nov. 14, 1950    4 Sheets-Sheet 3
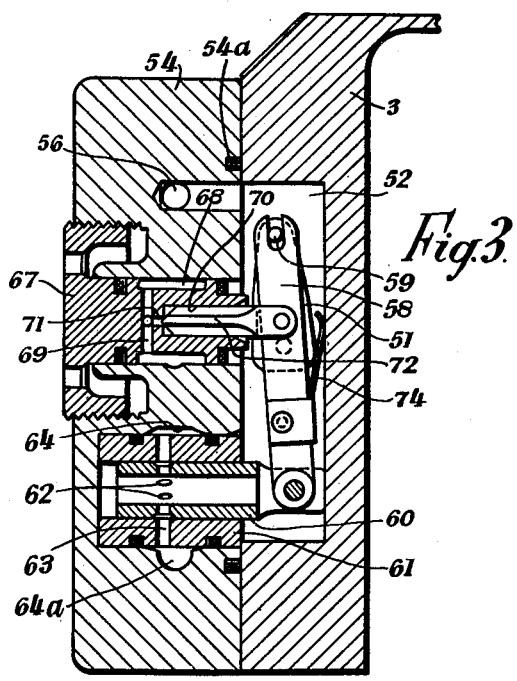
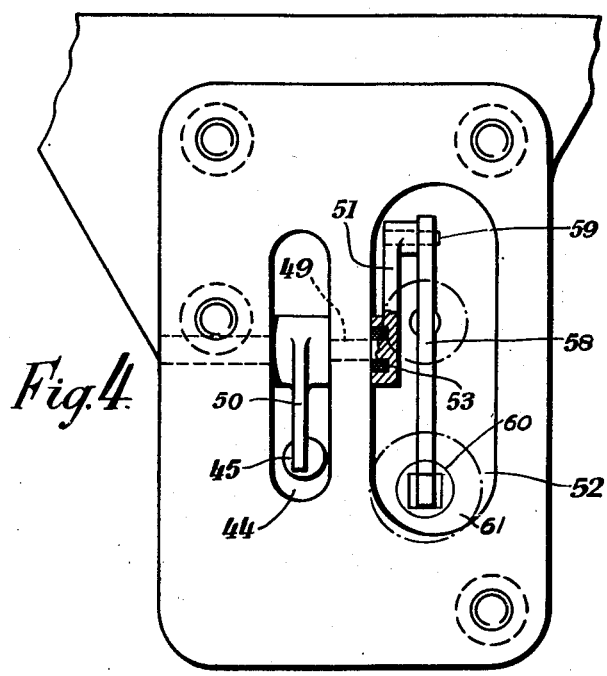

Oct. 20, 1953    H. W. TREVASKIS    2,656,017
AUTOMATIC BRAKING APPARATUS FOR AIRCRAFT
Filed Nov. 14, 1950    4 Sheets-Sheet 4

INVENTOR
Henry William Trevaskis
by Benj. T. Rauber
his attorney

Patented Oct. 20, 1953

2,656,017

UNITED STATES PATENT OFFICE 2,656,017

AUTOMATIC BRAKING APPARATUS FOR AIRCRAFT

Henry William Trevaskis, Solihull, England, assignor to Dunlop Rubber Company Limited, London County, England, a British company Application November 14, 1950, Serial No. 195,509
In Great Britain November 17, 1949

16 Claims. (Cl. 188—181)

This invention relates to an automatic braking system for aircraft.

When an aircraft having a wheeled or a tracked under-carriage lands, the brakes are normally applied by the pilot shortly after the first impact of landing. The brakes, which may be either hydraulically or pneumatically operated, are usually applied through a valve under the control of the pilot, the braking pressure on the wheel brakes being commensurate with, e. g., the angular movement of the valve lever. A great deal of care must be exercised by the pilot when braking, since if the brakes are applied too hard the wheels will lock, with consequent damage to the tires, and if not applied hard enough the aircraft may overrun the landing strip. There is always a definite pressure that should not be exceeded when it is required to brake the aircraft without damage to the tires, and this pressure may be defined as the maximum pressure which may be applied to the brake without causing the wheel to decelerate so violently as to cause skidding of the tyre on the landing surface. This pressure is not constant, but is dependant upon a number of factors, amongst them being the ground speed of the aircraft, the total weight of the aircraft carried by the wheels and the nature of the landing surface.

When landing, the pilot of the aircraft has many other duties to attend to, apart from selectively controlling the braking pressure at various stages along the landing run. It is therefore desirable to provide an automatic braking apparatus which will, to a large extent, relieve the pilot of any duties in connection with the brakes other than that of the initial application. Such an apparatus should be capable of automatically controlling the braking pressures during the landing run. It is the object of this invention to provide an automatic brake apparatus of this nature.

According to the invention apparatus for automatically controlling the braking pressure in an aircraft fluid pressure operated wheel brake comprises a housing rotatable by a wheel, a flywheel rotatable in said housing, a drum-member also rotatable in said housing and capable of limited angular displacement relative to said flywheel, means moveable axially by said angular displacement, and a valve mechanism adapted to be connected to a source of fluid pressure, to exhaust and to said brake and operated by axial movement of said means, whereby on relative angular displacement between the drum-member and flywheel in one direction the axially-moveable means operates the valve mechanism to reduce the braking pressure and on relative angular displacement in the other direction the axially moveable means operates the valve mechanism to restore the braking pressure.

Preferably the apparatus comprises a housing rotatable by a wheel, an annular flywheel rotatable in said housing having a beam extending diametrically across the interior thereof, a drum-member also rotatable within the housing and provided with two diametrically opposed stops adapted to contact the flywheel beam and restrict angular movement of the flywheel relative to the drum-member, a clutch mechanism rotatable by the housing and adapted to drive the drum-member, spring means to urge the flywheel into a predetermined angular position relative to the drum-member, means adapted to move axially on angular displacement of said flywheel relative to said drum-member and a valve mechanism operated by axial movement of said means to control the supply of pressure fluid from a source to said wheel brakes, whereby on relative angular displacement of the flywheel and drum member in one direction the axially-moveable means operates the valve mechanism to reduce the braking pressure, and on relative angular displacement of the flywheel and drum-member in the other direction the axially-moveable means operates the valve mechanism to restore the braking pressure.

In the apparatus of the present invention the housing may be rotated by any rotatable part of the wheel. For example the apparatus may be secured to one of the aircraft wheel struts and the housing may be rotatable by the side wall of the tire or by the edge of the wheel rim. Preferably however the apparatus is secured to a non-rotatable part of the brake apparatus, for example, the torque plate, and the housing is rotatable by the inner periphery of the wheel rim, or by a flange carried by said rim.

In order that the invention may be more fully described, reference is made to the accompanying drawings, of which:

Figure 3 is a part section through B—B of Figure 1, looking in the direction of the arrows.

Figure 4 is a view from the left of Figure 2, with the valve body removed.

Figure 1:
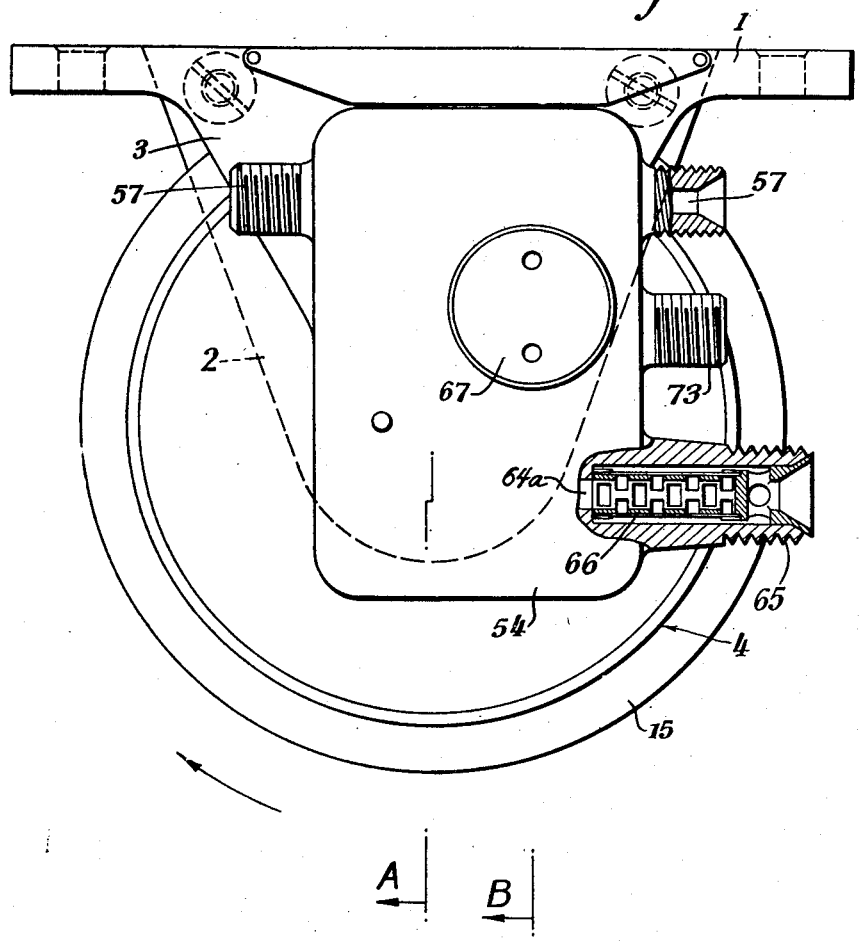
Figure 1 is a side elevation, partly in section, of an automatic brake apparatus constructed in accordance with the invention looking from the left of Figure 2.

In an embodiment of the invention (Figures 1 and 2) the apparatus comprises a flange 1 adapted to be secured by bolts to a non-rotatable portion of a wheel and brake assembly, for example, the torque plate. A bifurcated bracket integral with the flange has two arms 2 and 3 extending normally from the face of the flange. Rotatably mounted in said bracket is a hollow cylindrical housing 4, comprising a radially-extending wall 4a and axially-extending peripheral wall 4b integral therewith, and a separable radially-extend wall 4c.

The radial wall 4a of the housing is provided centrally with a boss 5 which extends axially an equal distance both interior and exterior of the housing, and the periphery of the boss is provided with a metal bearing 6. The face of the boss interior of the housing is provided centrally with a cylindrical recess 7. The part of the boss exterior of the housing runs in ball-bearings 8 which are held between the bearing 6 on said part of the boss and a bearing 9 located in the arm 2 of the bifurcated bracket adjacent the end of said arm.

The other radial wall 4c of the housing is provided centrally with a circular hole and an annular flange 10, and said flange extends an equal distance both interior and exterior of the housing. The outer periphery of the flange is provided with metal bearings 11, similar to those on the boss, and the part of the flange exterior of the housing runs in ball-bearings 12 which are held between the bearing 11 on said part of the flange and a bearing 13 located in the arm 3 of the bifurcated bracket adjacent the end of said arm. Sealing rings 14 are provided to prevent ingress of foreign matter to both ball-bearings 8 and 12.

The exterior periphery of the housing, i. e. the axially-extending wall 4b, is provided with a solid rubber twin-contact tire 15, which is adapted to contact the inner periphery of the wheel rim. The housing thus rotates freely when the wheel rotates.

Figure 5:
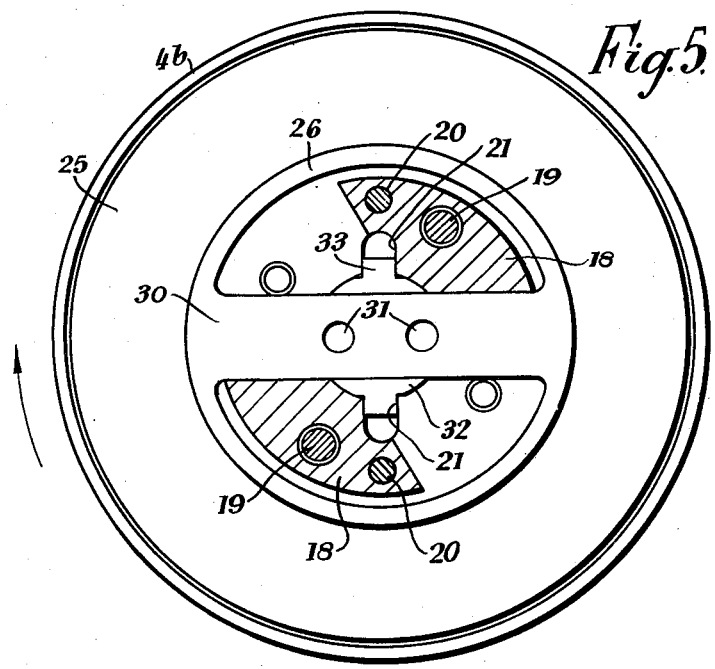
Figure 5 is a part section through C—C of Figure 2 looking in the direction of the arrows.

An annular drum member is fitted within the housing, and said drum-member comprises two coaxial drums 16 and 17 spaced apart by two diametrically opposed substantially arcuate portions 18 (Figure 5). The drum-member is for convenience made in two parts each comprising half the axial width of outer drum 16 and inner drum 17 and a part of the arcuate portions 18, and the two drum parts are held together by screws 19 and dowels 20 (Fig. 5), passing through the arcuate portions 18. The two ends of the inner periphery of the inner drum 17 seat on the bearings 6 and 11 on the interior portions of the boss and flange respectively and may rotate on said bearings. The inner drum 17 is provided with two diametrically opposed, axially-extending slots 21, for a purpose to be later described.

The outer periphery of the outer drum 16 is provided, in the median plane thereof, with a circumferentially-extending slot 22 (Fig. 2), and on each side of said slot is a circumferentially-extending recess 23 of rectangular section. Each of said recesses accommodates a series of ball-bearings 24.

Figure 2:
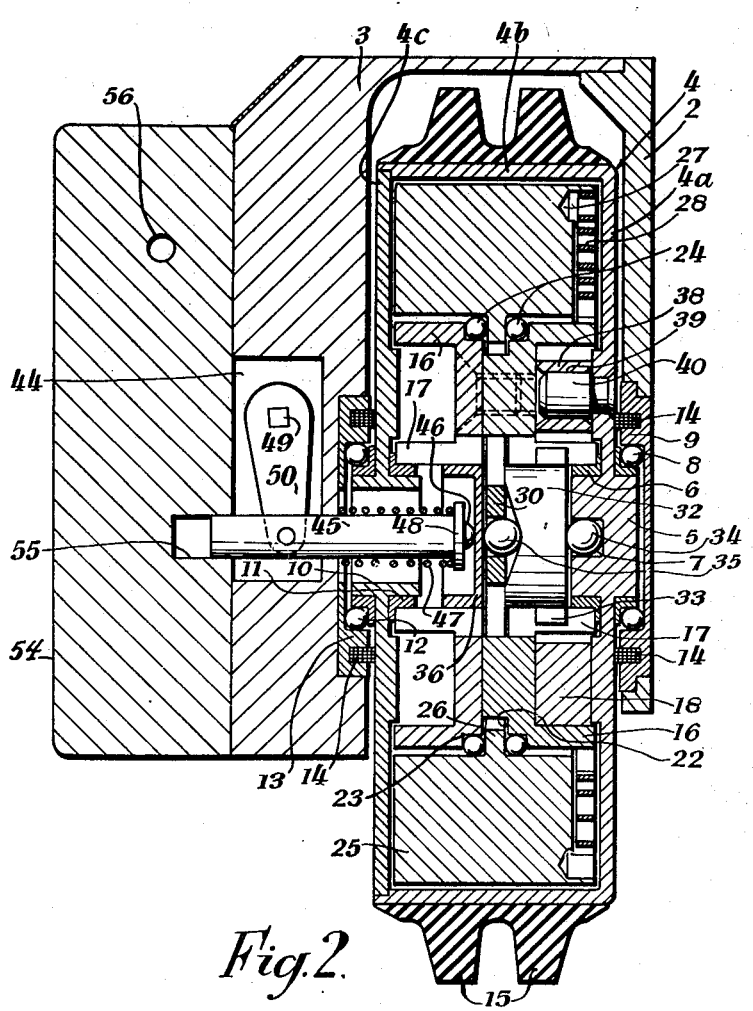
Figure 2 is a section through A—A of Figure 1, looking in the direction of the arrows.

An annular space is provided between the outer periphery of the outer drum 16 and the inner periphery of the housing and an annular flywheel 25 of considerable weight is located within said space (Figs. 2 and 5). The inner periphery of the flywheel is provided with a radially-extending rib 26 which fits within the slot 22 without contacting the sides or edges thereof and serves to prevent axial-misalignment of said ball-bearings. The inner periphery of the flywheel rests on said ball bearings which allow relative rotation between flywheel and drum member with little or no frictional resistance.

Figure 6:
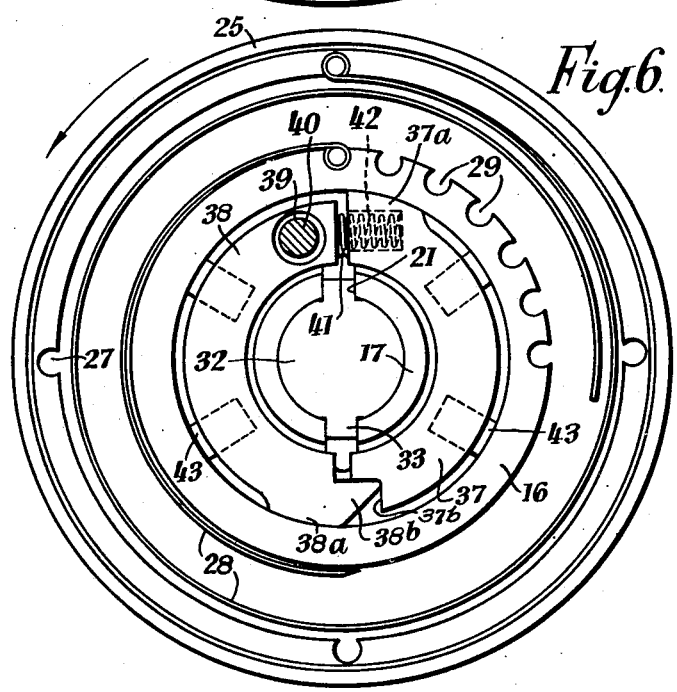
Figure 6 is a part view from the right of Figure 2 with the flywheel casing and bracket arm removed.

The radially-extending face of the flywheel adjacent the housing wall 4a is recessed from a location adjacent its outer periphery to its inner periphery and said face is provided, adjacent its outer periphery, with a plurality of equispaced, axially-extending blind holes 27 which break into the side of said recess. A clock-type coiled spring 28 is fitted in said recess, one end thereof being formed into an eye and secured in one of said holes 27. The edge of the outer drum 16 adjacent said housing wall 4a is likewise provided with a plurality of blind holes 29 (Figure 6) which break into the outer periphery of said outer drum, and the inner end of the clockspring is likewise formed into an eye, which is secured in one of said holes.

A thin beam 30 of rectangular section extends diametrically across the interior of the flywheel in the median plane thereof, and is integral with said flywheel. The beam passes between the arcuate portions 18 of the drum which act as stops to restrict the relative angular movement between the drum and the flywheel. Said beam is provided with two equi-sized holes 31 spaced one on each side of the centre of the beam and on the longitudinal axis thereof.

A cam member 32 is slidably fitted within the inner periphery of the inner drum 17 and said cam member is provided with two diametrically opposed keys 33 which engage in the slots 21 in said drum. The cam member is thus rotatable with the drum and axially slidable relative thereto. The cam member is fitted between the beam 30 of the flywheel and the boss 5 of the housing, and an anti-friction ball 34 is provided in the recess 7 in the boss against which the plane face of the cam member abuts. The other face of the cam member, i. e. that adjacent the beam, is provided with a shallow recess of V-section. Two balls 35, situated one in each of said holes 31 of the beam are adapted, in one angular position of the beam, to lie in the apex of the V-sectioned recess in the cam member. The balls are prevented from quitting said holes by a disc 36 which slidably fits in the inner periphery of the inner drum on the side of the beam remote from the cam member.

A clutch mechanism is fitted in the annular recess between the inner and outer drums 16 and 17 on that side of the drum member adjacent the housing wall 4a. Said clutch comprises two part-annular torque-arms 37 and 38 (Figure 6) arranged to form substantially a complete annulus within said recess. A clearance is provided between the inner periphery of each of said torque arms 37, 38 and the outer periphery of the inner drums 17. A similar clearance is provided between the outer periphery of each of said arms 37, 38 and the inner periphery of the outer drum 16 except that each of said arms is provided integrally at one end with a radially extending portion 37a, 38a, which frictionally engages said inner periphery.

The torque arm 38, adjacent the end remote from the portion 38a, is provided with an axially extending hole 39 and fitting in said hole is a stud 40 which is secured to the housing wall 4a. Said end is likewise provided with a coiled helical spring 41 having one end secured thereto and the other end fitting in a coaxial hole 42 in the adjacent end of the torque arm 37.

The end of torque arm 37 remote from the portion 37a is provided, on its outer peripheral surface, with a rectangular recess, into which fits a wedge-shaped portion 38b integral with the associated end of the torque arm 38. The spring 41 thus urges the associated ends of torque-arms 37 and 38 apart, and forces the portion 37a and 38a into frictional contact with the inner periphery of the outer drum 16. The construction of the clutch mechanism is such that rotation of the aircraft wheel, housing 4 and clutch mechanism 37, 38 relative to the drum-member in one direction, i. e. forward rotation of the aircraft wheel, produces a considerable "wedging" or servo-action of the torque-arms about the drum-member; whereas relative rotation of the clutch mechanism in the other direction produces only a proportion of this torque, and no servo-action is obtained. Grease retainers 43 are provided in the outer periphery of torque arms 37 and 38 to lubricate the frictional surface of the brake drum.

The arm 3 of the bifurcated bracket is considerably thicker than the arm 2 and is of rectangular shape. On the face of the arm 3 remote from the flywheel a substantially rectangular recess 44 (Figs. 2 and 4) is provided and from the base of the recess a hole, coaxial with the housing, extends through the arm. A thrust rod 45 slidably extends through said hole and has one end projecting into the flywheel and the other end projecting into said recess. The end of the thrust rod projecting into the flywheel abuts the disc 36, and to restrict friction between the rotatable disc and the non-rotatable rod, said rod is provided with a part-spherical projection 46. The end of the thrust rod is maintained in contact with the disc by a helical spring 47 encircling said rod which has one end abutting the arm 3 of the housing and the other end abutting an annular flange 48 extending radially from said rod adjacent the end within the housing.

The end of the thrust rod remote from the flywheel projects a short distance out of the recess 44 in the face of the arm 3, and the portion of the thrust rod within the recess is provided with a flat side. Pivotally secured to said side is one end of a cranked lever which comprises a spindle 49 (Fig. 4), a lever arm 50 integral with one end thereof and a lever arm 51 secured to the other end thereof in a second recess 52 in the arm 3 parallel to the recess 44. The lever arms 50 and 51 are diametrically opposed and of equal length and the end of the lever arm 50 is secured to the flat of the thrust rod by a pin.

The arm 3 of the bifurcated housing is provided with a second recess 52 adjacent the recess 44, the longitudinal axes of said recesses being parallel. The spindle of the cranked lever is rotatably fitted through a hole extending between said recesses 44 and 52. Thus the lever arm 50 is situated in recess 44 and lever arm 51 is situated in recess 52. A sealing washer 53 is provided in recess 52 to prevent leakage of pressure fluid through the hole between the recesses.

A rectangular valve body 54, Figure 3, is secured to the face of the arm 3 remote from the housing, and said body converts the two recesses 44 and 52 into chambers. The chamber 52 is made substantially fluid tight by the provision of a sealing ring 54a around the periphery thereof. The valve body is provided with a blind hole 55 (Fig. 2) communicating with the recess 44 and axially in line with the thrust rod 45, into which the end of the thrust rod is slidably fitted. A fluid pressure conduit 56 (Figs. 2 and 3) within the valve body communicates at one end with the pressure chamber 52 and at the other end with two brake operating nozzles 57 (Fig. 1) adapted to be connected to two fluid pressure operated mechanisms of the associated aircraft wheel brake.

A valve beam 58 (Figs. 3 and 4) is longitudinally disposed within the pressure chamber 52, and one end of said beam is slotted and a peg 59 integral with the end of the lever arm 51 is located in said slot. To the other end of the valve beam is pivotally connected one end of a tubular inlet slide valve 60, which operates in a liner 61 fitted in a hole in the valve body communicating with the pressure chamber 52, and has a portion adapted to abut the wall of the chamber adjacent the housing. The slide valve is provided with a plurality of radially extending holes 62 communicating with an annular groove in the outer periphery of the valve, and in one position of said valve the recess communicates with a plurality of radially extending holes 63 through the liner 61. These holes communicate with an annular groove 64 around the periphery of the hole in the valve body and said groove in turn communicates with a pressure conduit 64a (Figs. 1 and 3) leading to an inlet nozzle 65 which is adapted to be connected to a source of fluid pressure. A filter 66 is fitted within the inlet nozzle to prevent entry of foreign matter to the valve.

An exhaust valve plug 67 has a head portion screw fitted in a threaded hole in the outer face of the valve body 54 and a barrel portion slidably fitted in a hole extending through the body and communicating with the pressure chamber 52. The barrel portion is provided on its outer periphery with an annular recess 68 of rectangular section and from the end of the recess remote from the pressure chamber a plurality of holes 69 extend diametrically across said portion. A hole 70 extends axially from the pressure chamber end of the barrel and terminates a short distance from the holes 69 and a smaller coaxial hole 71 connects the end of hole 70 and the junction of the diametric holes 69. The junction of the hole 71 and the hole 70 forms the exhaust valve seat.

An exhaust valve 72 is slidably fitted in the hole 70, one end thereof being tapered to seat on the exhaust valve seat and the other end being pivotally connected to the valve beam 58 intermediate its ends and about one-third of its length from the slotted end. The valve is provided with longitudinally extending flutes to enable pressure fluid to pass along the hole 70. A conduit (not illustrated) communicates at one end with the annular recess 68 and at the other end with an exhaust nozzle 73 (Fig. 1). The valve beam 58 is provided with a leaf-spring 74 which has one end secured to said beam adjacent the inlet valve and the other end abutting the wall of the pressure chamber adjacent the housing and substantially in line with the exhaust valve. This spring serves to ensure that the exhaust valve closes before the inlet valve opens and opens after the inlet valve closes.

When the aircraft wheel is stationary, the flywheel housing, flywheel and drum-member associated therewith are likewise stationary, and the flywheel is forced by the clockspring into such an angular position relative to the drum member that the flywheel beam is abutting the arcuate-shaped portions. In this position of the flywheel beam the two balls 35 located in holes 31 in said beam are seated in the bottom of the V-shaped slot in the cam member and the thrust-rod is urged by its associated spring into such a position that the valve beam maintains the exhaust valve in a closed position and the inlet valve in the open position.

The apparatus operates as follows: As the wheels of the landing aircraft settle on the runway they commence to rotate, and as each wheel rotates it causes the housing associated therewith to rotate. The stud extending axially from one wall of the housing and engaging in a hole in one of the torque arms of the clutch mechanism causes the said clutch to rotate with the housing and with the drum-member stationary and the torque-arms rotating with the housing a considerable amount of torque is obtained, as hereinabove described, which is sufficient to drive the drum almost instantaneously. There is, in fact, a fractional amount of slip, just sufficient to cushion the shock and prevent damage to the flywheel beam and associated parts. The beam of the flywheel is held against the arcuate-shaped stops of the drum member by the inertia of the flywheel and by the force of the clockspring, and hence there is no relative angular movement between the flywheel and drum member. The cam member 32 is keyed to the inner drum and so rotates with the drum and the two balls 35 situated in the holes in the flywheel beam remain seated in the bottom of the V-shaped recess of cam 32 as shown in Fig. 2. No linear movement is thus imparted to the thrust rod and the inlet valve remains open and the exhaust valve shut. All the components within the housing, with the exception of the thrust rod, are now rotating at the same speed as the housing.

As the landing aircraft settles evenly on the runway the pilot applies his control which allows pressure fluid to flow through the valve and to the wheel brakes and so apply braking pressure. The wheel will decelerate and the housing 4, rotated by the wheel, decelerates at the same rate. The torque arms 37, 38 of the clutch mechanism are mechanically keyed to the housing 4 and also decelerate with the wheel and housing. A low torque value is obtained between torque arms and drum-member during relative angular displacement in this direction and this torque decelerates the drum comparatively slowly. If the deceleration of the wheel is such that skidding is liable to occur, the flywheel 25, having a greater inertia, takes up an angular position against the force of its associated clockspring such that the beam 30 swings through the permitted arc between the arcuate segments, or stops, of the drum member 32. The cam member is keyed to the drum 17, and hence the balls 35 in the two holes in the flywheel beam 30 ride up the inclined sides of the V-shaped recess in said cam member 32, forcing the disc 36, on the other side of the beam, in an axial direction away from the cam member.

The thrust-rod 45 has one end abutting this disc, and is forced, against its associated spring 47, away from the flywheel. This linear movement, acting through the cranked lever 50 and through the valve beam 58 first closes the inlet valve 50 and then opens the exhaust valve 72. The braking pressure is thus relieved, and the wheel revolves normally once more before skidding actually occurs.

With the wheel and housing rotating normally the flywheel 25 urged by the spring 28 and due to the acceleration of the wheel, takes up its original angular position wherein the flywheel beam 30 is abutting one side of the arcuate stops 18 of the drum member, as previously described, and in this position the balls 35 associated with the flywheel beam 30, urged by the spring-loaded thrust-rod 45 and disc 36, move back into the bottom of the groove in the cam member, and this permits the thrust-rod to move sufficiently to first close the exhaust valve 72 and then open the inlet valve 60, as previously described, and so re-apply the brakes.

This "hunting" will continue until the possibility of the tire skidding on the surface of the runway is over. It must be appreciated that this "hunting" is extremely rapid and is imperceptible to anyone in the aircraft. For example, the housing may rotate at 3,500-4,000 revs. per min. and since less than half a revolution of relative angular movement between the flywheel and drum-member will suffice to open or close the valve it will be seen that this operation will take but a fraction of a second.

It frequently happens that aircraft "bounce" on landing, i. e. after the aircraft wheels have commenced to rotate and after the pilot has applied the brakes and unless the pilot manually removes the braking pressure before re-alighting, the unloaded wheels will lock and the aircraft will skid violently on re-alighting. This is obviously undesirable and in the apparatus of the present invention means are provided to prevent this occurring.

If the aircraft "bounces" on landing after the brakes have been applied, the weight of the aircraft is removed from the wheels, which lock, that is to say, the wheel, housing and torque arms are rendered non-rotatable. As previously described, the greater inertia of the flywheel causes it to continue rotating against the slight frictional resistance created between the torque arms and drum, and this angular movement of the flywheel relative to the drum compresses the clockspring and closes the inlet valve and opens the exhaust valve thereby relieving braking pressure. If the aircraft wheel were rolling normally over the ground the acceleration of the wheel would then angularly accelerate the drum member relative to the flywheel to open the inlet valve once more. In this case however the aircraft is airborne and the wheel is rotating slowly or stationary. The flywheel beam 30 is abutting the arcuate-shaped segments 18 of the drum member and the inertia of the flywheel is sufficient to carry the drum-member around with it, against the slight frictional resistance created between the stationary torque arms 37, 38 and the rotating drum-member 17. The exhaust valve 72 is maintained open and the inlet valve 60 closed until the frictional resistance between torque arms and drum-member is sufficient to overcome the inertia of the flywheel. When this occurs the spring 28 moves the flywheel back into its original position relative to the drum-member, the exhaust valve opens, the inlet valve shuts, and the brake is once more applied. By this time, however, the wheels will once more be rolling over the landing surface.

The apparatus according to the invention may be used in braking an aircraft by two distinct methods. By the first method, the pilot desires to brake his aircraft in the shortest possible distance without damage to his tyres and landing gear. The maximum braking pressure is applied through the pilot's control as soon as the landing wheels are rotating, and the automatic apparatus controls the pressure into the brakes throughout the landing run. Thus the mean braking pressure is restricted as the landing wheels are partly airborne and increases as the load on the wheels increases and reaches its maximum towards the end of the landing run, when there is no danger of skidding. By the second method, the pilot has an unrestricted landing run and operates his control to give only, say, one-third maximum pressure. The automatic apparatus in this case will only restrict braking pressure at the early stages of the landing run, when the aircraft is partly airborne, to prevent skidding. It is of course to be understood that should an aircraft wheel encounter, e. g. a patch of oil or ice at any point on the landing run, the automatic apparatus will immediately come into operation to restrict braking pressure and so stop skidding.

Apparatus in accordance with the invention is normally fitted to each wheel of an aircraft which is fitted with brakes, so that the wheels may be braked independently of one another. Any type of fluid pressure operated brake may be fitted to the wheel; preferably, however, the brakes are hydraulically operated.

What I claim is:

1. Apparatus for automatically controlling the braking pressure in an aircraft fluid pressure operated wheel brake comprising a housing rotatable by a wheel, a flywheel rotatable in and driven by said housing, a drum-member also rotatable in said housing and capable of limited angular displacement relative to said flywheel, means moveable axially by said angular displacement, and a valve mechanism adapted to be connected to a source of fluid pressure, to an exhaust and to said brake and operated by axial movement of said means, whereby on relative angular displacement between the drum-member and flywheel in one direction the axially-moveable means operates the valve mechanism to reduce the braking pressure and on relative angular displacement in the other direction the axially moveable means operates the valve mechanism to restore the braking pressure.

2. Apparatus for automatically controlling the braking pressure in an aircraft fluid pressure operated wheel brake comprising a housing rotatable by a wheel, a flywheel rotatable in and driven by said housing, a drum-member also rotatable in said housing and capable of limited angular displacement relative to said flywheel on a change of relative angular velocity, a clutch mechanism rotatable by the housing and driving the drum-member, a spring associated at one end with said flywheel and at the other end with said drum-member and urging said flywheel into a predetermined angular position relative to said drum-member, means movablye axially on relative angular displacement of said flywheel from said predetermined position and a valve mechanism adapted to be exhaust and to said brake and operated by axial movement of said means, whereby on relative angular displacement between the drum member and flywheel in one direction the axially-movable means operates the valve mechanism to reduce the braking pressure and on relative angular displacement in the other direction the axially movable means operates the valve mechanism to restore the braking pressure.

3. Apparatus for automatically controlling the braking pressure in an aircraft fluid pressure operated wheel brake comprising a housing rotatable with a wheel, an annular flywheel rotatable in and driven by said housing having a beam extending diametrically across the interior thereof, a drum-member also rotatable in said housing and within the inner periphery of said flywheel and provided with two diametrically opposed stops adapted to contact the flywheel beam and restrict angular displacement of the flywheel relative to the drum-member, a clutch mechanism rotatable by the housing and driving the drum-member, a coil spring associated at one end with said flywheel and at the other end with said drum-member and urging said flywheel into a predetermined angular position wherein the flywheel beam abuts one side of said stops, means movable axially on relative angular displacement of said flywheel from said predetermined angular position and a valve mechanism adapted to be connected to a source of fluid pressure, to an exhaust and to said brake and operated by axial movement of said means, whereby on relative angular displacement between the drum member and flywheel in one direction the axially-movable means operates the valve mechanism to reduce the braking pressure and on relative angular displacement in the other direction the axially movable means operates the valve mechanism to restore the braking pressure.

4. Apparatus according to claim 3 wherein the drum-member comprises inner and outer coaxial drums and the clutch mechanism comprises two part-annular torque arms located between said drums and spring-urged apart at one end, each of said torque arms having a part at one extremity thereof frictionally engaging with the inner wall of the outer drum.

5. Apparatus according to claim 3 comprising a cylindrical cam member fitting in the inner periphery of the drum-member and rotatable with said drum-member by dogs engaging in axially extending grooves in the inner periphery of said drum member, a V-sectioned recess in one face of said cam member, two balls located in adjacent holes equispaced one on each side of the centre of said flywheel beam and seated in the bottom of said recess in said predetermined position of the flywheel relative to the drum-member, a disc slidably fitting in the inner periphery of the drum-member on the other side of the beam and a thrust-rod having one end spring urged into contact with said disc, whereby on relative angular movement between the flywheel and drum-member the balls ride up the inclined sides of said V-sectioned recess and force the disc and the thrust-rod in an axial direction against their associated spring.

6. Apparatus according to claim 5 wherein said valve mechanism comprises a pressure chamber having a conduit adapted to communicate with a fluid pressure operated brake, an inlet conduit adapted to communicate with a source of fluid pressure and an exhaust conduit, an angularly moveable valve beam located in said chamber having one end mechanically connected to one end of said axially moveable means, an inlet valve in said inlet conduit and an exhaust valve in said exhaust conduit, said valves being linked to said valve beam, whereby movement of said axially moveable means in one direction operates the valve beam to close the inlet valve and open the exhaust valve, and movement of said axially moveable means in the other direction similarly opens the inlet valve and closes the exhaust valve.

7. Apparatus according to claim 6 wherein relative angular displacement between the flywheel and drum-member in one direction acting through the cam-member and balls moves the thrust-rod axially against its associated spring to operate the valve beam and close the inlet valve and open the exhaust valve, and relative angular displacement of the flywheel and drum-member in the other direction similarly opens the inlet valve and closes the exhaust valve.

8. Apparatus according to claim 7 wherein the valve beam is spring urged in one direction whereby the exhaust valve closes before the inlet valve opens and opens after the inlet valve closes.

9. Apparatus according to claim 4 wherein one of the torque arms is provided with a wedge-shaped portion which fits into a rectangular recess formed in the adjacent end of the other torque arm to produce an increased torque when said arms are spring-urged apart to contact the inner wall of said outer drum.

10. Apparatus for automatically controlling the braking pressure in an aircraft fluid pressure operated wheel brake comprising a housing rotatable by a wheel, a flywheel rotatable in said housing, a drum member also rotatable in said housing and capable of limited angular displacement relative to said flywheel, a rubber tire fitted to an outer periphery of said housing to provide drive means for said housing, and adapted to contact a rotatable part of the wheel, a thrust rod movable axially by said angular displacement and a valve mechanism adapted to be connected to a source of fluid pressure, to exhaust, and to said brake, and operated by axial movement of said thrust rod, whereby on relative angular displacement between the drum member and the flywheel in one direction the thrust rod operates the valve mechanism to reduce the braking pressure and on relative angular displacement in the other direction the thrust rod operates the valve mechanism to restore the braking pressure.

11. Apparatus for automatically controlling the braking pressure in fluid operated wheel brakes which comprises a housing rotatable by engagement with a wheel, a drum rotatable coaxially within said housing relatively to said housing, an over riding clutch connection from said housing to said drum and having a wedging engagement in forward direction and a slipping drag in over riding movement, a cam rotating with said drum, a flywheel driven by said drum and having a limited forward movement relative to said drum, a cam follower carried by said flywheel and displaced by said cam on relative displacement of said flywheel and drum and a valve for brake fluid having an inlet port, an outlet port, and an exhaust port, and actuated to close said inlet port and open said outlet port in succession on displacement of said cam follower by said cam.

12. The apparatus of claim 11 having a spring urging said flywheel into a predetermined position relative to said drum.

13. The apparatus of claim 11 in which said flywheel encircles said drum and has a diametrical bar carrying said cam follower and said drum has a part transverse to said diametrical bar positioned to engage said bar to drive said flywheel forwardly.

14. The apparatus of claim 11 in which said over riding clutch comprises an arcuate arm pivoted on one element of the drum and housing assembly and a spring pressing the free end of this arm against the other element of said assembly.

15. The apparatus of claim 11 in which said valve is actuated from said cam follower by a lever, and a spring pivot for said lever reacting adjacent the point of attachment to the exhaust valve to close said valve prior to opening of the inlet valve.

16. The apparatus of claim 11 in which said over-riding clutch comprises a pair of arcuate arms located within the drum, one of said arms being pivoted at one end on the housing and engaging at the other end with one end of the other arm, and a spring located between the opposite ends of said arms to press said ends apart.

HENRY WILLIAM TREVASKIS.

References Cited in the file of this patent

UNITED STATES PATENTS

| Number | Name | Date |
| --- | --- | --- |
| 2,107,823 | Hallet | Feb. 8, 1938 |
| 2,163,731 | Hallet | June 27, 1939 |
| 2,225,978 | Carmichael | Dec. 24, 1940 |

FOREIGN PATENTS

| Number | Country | Date |
| --- | --- | --- |
| 48,806 | France | May 3, 1938 |